United States Patent Office 3,632,792
Patented Jan. 4, 1972

3,632,792
STEEL-REINFORCED COMPOSITE
Lawrence E. Nielsen, Creve Coeur, and Joseph E. Fields, Ballwin, Mo., assignors to Monsanto Company, St. Louis, Mo.
No Drawing. Continuation-in-part of application Ser. No. 753,850, Aug. 20, 1968. This application Nov. 29, 1968, Ser. No. 780,273
Int. Cl. C08f 45/10
U.S. Cl. 260—41
7 Claims

ABSTRACT OF THE DISCLOSURE

A shaped composite structure comprising steel fiber as reinforcing filler in a matrix comprising the zinc salt of an acrylic acid polymer, and the method of preparing the same which comprises heating in a mold at a temperature of from about 175° C. to 400° C. and a pressure of from about 5,000 p.s.i. to 50,000 p.s.i. a mixture of zinc oxide and an acrylic acid polymer in contact with the steel fiber.

CROSS-REFERENCES TO RELATED APPLICATIONS

This application is a continuation-in-part of our application Ser. No. 753,850, filed Aug. 20, 1968, now abandoned. The invention herein described was made in the course of or under a contract or subcontract thereunder, with the Office of Naval Research.

BACKGROUND OF THE INVENTION

(1) Field of the invention

Fiber-reinforced shaped composite structures comprising metal salts of acrylic acid polymers.

(2) Background of the invention

Metal salts of some polymeric acids, including polyacrylic acid and acrylic acid copolymers, are described in the article by W. E. Fitzgerald and L. E. Neilsen, "Viscoelastic Properties of the Salts of Some Polymeric Acids," Proc. Royal Soc., A 282, 137–146 (1964), and in the D. A. Feigley, Jr., Pat. No. 2,880,090 and the A. L. Smith et al. Pat. No. 2,961,364. Depending upon the metal and upon the nature of the organic portion of the polymer, the salts vary greatly in solubility and thermal stability. In said Feigley and said Smith et al. patents, the polymeric salts are applied to fibers in dispersion, and the coated fibers thus obtained are employed as reinforcing fillers in a different type of matrix, e.g. in a vinyl halide resin or in a thermosetting resin. Hence the properties of the composite structures obtained by said patentees are not so dependent upon the polymeric metal salt as they are when the latter is the matrix rather than only a coating for the filler. As reported in the Fitzgerald and Nielsen paper, metal salts of the polymeric acids, alone, are too brittle for most structural applications.

According to the invention, valuable composite structures are obtained when the polymeric metal salt is specifically the zinc salt of an acrylic acid polymer and the filler is steel fiber or filament. Employing these two constituents, it is unnecessary to use extraneous polymeric materials, either of the vinyl or of the thermosetting type, for obtaining tough molded products. Very surprisingly, there are obtained from the acrylic polymeric zinc salts as the matrix constituent and the steel fiber as reinforcing filler, molded pieces having unusually good flexural properties, e.g., flexural strengths of over 90,000 p.s.i. and flexural moduli of over 10 million p.s.i.

SUMMARY OF THE INVENTION

The invention provides shaped composite structures comprising steel fiber as reinforcing filler and, as matrix for said fiber, the normally solid zinc salt of polyacrylic acid or of a copolymer of acrylic acid and a vinyl monomer copolymerizable therewith, the ratio of said acrylic acid to said vinyl monomer being such that said copolymer consists at least 50 mole percent of acrylic acid units.

The reinforcing fiber may be of any of the iron alloys commonly known as steels, e.g., vanadium steel, molybdenum steel, stainless steel, etc., in filamentous form. It may be present in the composite in long (continuous) or short (discontinuous) form. When present in either form it may be positioned uniaxially, i.e., in orientation along its axis, or heterogeneously. The steel filament may also be present in woven or braided form, e.g., as a tape, whereby the composite structure is essentially a laminate comprising alternating layers of the zinc salt and a braid, screen or textile of steel filaments. For convenience and in accordance with practice in the composite art, the filaments will be hereinafter referred to as fibers.

The shaped composites are preferably made by mixing solid, finely comminuted polymer with zinc oxide in a quantity calculated to be approximately that which is stoichiometrically required for reaction of two carboxy groups of the polymer with one molar equivalent of zinc oxide, contacting the resulting mixture with the steel fiber, and compression molding the whole at a temperature of from about 175° C. to 400° C. and a pressure of from about 5,000 to 50,000 p.s.i.

DESCRIPTION OF THE PREFERRED EMBODIMENTS

The preferred matrix of the presently provided composite structure is a zinc salt of an acrylic acid polymer; the preferred reinforcing filler is steel fiber. The acrylic acid polymer may be a homopolymer of acrylic acid or a copolymer of acrylic acid and a monomer copolymerizable therewith, e.g., a compound having the group $>CH=CH-$, such as vinyl acetate, vinyl chloride, styrene, acrylonitrile, acrylamide, etc. Copolymers of acrylic acid and alkyl acrylates are especially useful, and particularly preferred for the present purpose are copolymers consisting at least 50 mole percent of acrylic acid with the balance being alkyl acrylate units wherein the alkyl radical has from 1 to 12 carbon atoms, e.g., butyl, methyl, ethyl, isopropyl, pentyl, hexyl, 2-ethylhexyl, n-octyl, tert-nonyl, n-decyl, 2-ethylnonyl, or n-dodecyl acrylate. Use of such alkyl acrylate comonomers with the acrylic acid appears to contribute to a degree of flexibility of copolymer which is amenable to the preparation of the more useful zinc salts.

The presently useful steel fiber may be employed in the continuous or discontinuous form. By "continuous form" is meant the positioning of the filament length along one dimension of the composite structure. By "discontinuous form" is meant use of very small lengths of the filament, say, pieces which may vary from about say $\frac{1}{32}''$ or less to about $\frac{1}{2}''$, which pieces are usually smaller than any one dimension of the shaped object. Use of continuous lengths of the fiber generally provides for uniaxial positioning of the fiber; the orientation thus obtained generally contributes to the strength of the shaped composite.

The thickness or cross-sectional dimension of the steel fiber may also vary over wide limits; but, in general in the case of the round fibers, those having diameters between about 0.0005 inch and 0.025 inch are preferred. In the case of rectangular fibers, those having cross-sectional areas equivalent to those of the aforementioned round fibers are presently preferred. When the fibers are used in discontinuous form, i.e., in short lengths, the aspect ratio (length/diameter) will advantageously be from about 50 to 1,000. If desired, the steel fibers may be used in the form of "wool," e.g., the well known steel wool of commerce in which the fibers are of substantially continuous length.

The quantity of steel fiber in the composites will vary greatly, depending upon the properties desired; however, in order to impart significant improvement as compared to the unreinforced polymeric material, the fiber should be present in a quantity of at least 5 percent by volume of the composite. Steel fiber loadings of as high as about 90 percent by volume are attainable; however, for obtaining the optimum modulus and strength characteristics, it is preferred to employ the steel fiber in a quantity which is from, say, about 15% to 60% by volume of the finished composite.

The zinc salt of the acrylic polymer is generally formed in situ during the molding. Preferably, the shaped composite is made by mixing finely comminuted acrylic polymer with finely comminuted zinc oxide, and contacting this mixture with the steel fiber. Reaction of the zinc oxide with the carboxy groups of the polymer during the molding occurs by salt formation. The salt thus formed may be a di-salt produced by cross-linking of two carboxy radicals which are present in different polymer chains, or it may be a di-salt formed by intramolecular cyclization of two carboxy groups on the same chain. When large excesses of zinc oxide are present, over the quantity required for the formation of the di-salts, the zinc oxide may also react to form the pendent mono-salt, wherein single carboxyl radical of the polymer is changed to the group

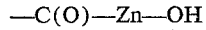

—C(O)—Zn—OH rather than two carboxy radicals changed to the grouping

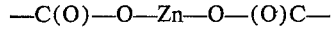

—C(O)—O—Zn—O—(O)C— either inter- or intra-molecularly.

Because the di-salts possess more desirable mechanical and temperature properties than do the mono-salts, it will be generally found advantageous to employ the zinc oxide in a quantity which is about that which is stoichiometrically required for reaction of two carboxy groups of the polymer with one molar equivalent of zinc oxide. However, the zinc oxide may be used in lesser or greater quantities. When present in lesser quantities, the product may be substantially free of the mono-salt groups, but it will possess unreacted carboxy radicals. For many purposes, this is not detrimental to satisfactory utilization of the shaped composites. When the zinc oxide is present in a quantity which is more than that required for di-salt formation, the product will generally consist of some mono-salts and di-salts, and possibly unreacted zinc oxide. Although such compositional heterogeneity does not result in products of optimum properties, here again, for some applications, the shaped composites are amply useful. Generally, however, it will be found that a mixture of carboxy-containing polymer and zinc oxide in a proportion of from, say, about one mole of zinc oxide per from 1 to 2.5 carboxy radicals of the polymer will give good results when employed with reinforcing fibers of steel.

When the steel fiber filler is used in discontinuous form, the mixture of zinc oxide and polymer is mixed with the very short lengths of fiber to homogeneity, and the whole is placed in the mold for forming under heat and pressure. When the steel fiber is used in lengths which are substantially equal to the dimension of the desired article, the lengths are positioned in the mold in either uni- or multi-directional array in layers which alternate with layers of the zinc oxide-polymer mixture. Tapes, braids, screens or textiles of the steel fiber are similarly used in the mold for the production of laminates.

It has been found that it is advantageous to allow the polymer to soften and flow in the mold before the temperature is raised to that which favors reaction of zinc oxide with the carboxylic groups of the polymer. For that reason, the molding cycle preferably includes gradual increase of the temperature to about 130 to 250° C. while increasing the pressure, whereby intimate contact of the reactants is obtained and dimensional conformity to the mold surfaces is realized. For salt-formation, a temperature of about 300° C. gives optimum results; generally, depending upon the nature of the polymer and the zinc oxide: polymer ratio, a temperature range of, say, from about 250° C. to 350° C. and pressures of from about 5,000 to 50,000 p.s.i., preferably from 7,500 to 15,000 p.s.i., will be used after the initial flow period. During the molding cycle, the pressure is advantageously released from time to time in order to permit the evolved water vapor to escape before the final molding temperature is reached. In experimental runs, the completeness of the chemical reaction, and hence of the molding process, may be checked by X-ray analyses of the metal oxide and by infrared analyses of the carboxylic acid group in the molded specimen.

Although the high temperatures and pressures which are used during the molding would suggest the possibility of reaction between the zinc oxide and/or the carboxy-containing polymer and the steel fiber which might lead to degradation of the filler strength, in the present instance there appears to be no weakening of the steel fiber during composite fabrication; and, although interaction of a kind may occur between the zinc salt of the acrylic polymer and said filler, or between the filler and the precursors of said salt, such interaction, if any, results in a beneficial effect which is exhibited by the extremely good mechanical and thermal properties of the composite.

Previous to incorporation with the zinc oxide and the acrylic polymer, the fiber may or may not be pretreated with an anchoring or bonding agent. Such an agent is usually a bifunctional compound having a reactive group which reacts with or becomes otherwise attached, e.g., by hydrogen bonding, to the filler, and another reactive group which reacts with, or is somehow attached to, the resin matrix. An example of a commonly used anchoring agent is γ-aminopropyltriethoxysilane, which is a readily available commercial agent of the family of silane couplers. Other aminoalkylalkoxysilanes which may be used are those which are disclosed in U.S. Pat. Nos. 2,832,754 and 2,930,809. Although these couplers or any of the silane couplers are of most present interest, other anchoring or coupling agents are likewise useful, e.g., the Werner type complex compounds such as methacrylatochromic chloride or other compounds of this type discribed in U.S. Pat. No. 2,552,910.

The invention is further illustrated by, but not limited to, the following examples.

Example 1

Stainless steel fiber (Brunswick Corporation, MF–Al), in the form of roving and having a thickness of about 1 mil, was stretched over a metal frame and coated with a very dilute aqueous solution of 94:6 weight ratio acrylic acid/2-ethylhexyl acrylate copolymer. After air-drying at 100° C. for about 10 minutes, the coated roving was cut into approximately 4″ lengths. A molding lay-up was prepared using alternate layers of lengths of the thus-treated steel fiber and a powdered mixture prepared from 10.0 g. of 94:6 weight ratio acrylic acid-2-ethylhexyl acrylate copolymer and 5 g. of zinc oxide. The lay-up consisted of a bottom layer of 0.12 g. of said powdered mixture followed by a layer of 0.5 g. of said cut roving, uniaxially arranged. A total of 6 layers of the powder and 5 layers of the roving were used in alternating order. The following molding cycle was used:

to 200° C. and 10,000 p.s.i.—15 min., then vent
to 250° C. and 10,000 p.s.i.—15 min., then vent
at 250° C. and 10,000 p.s.i.—30 min., then vent
to 300° C. and 10,000 p.s.i.—15 min., then vent
at 300° C. and 10,000 p.s.i.—15 min., then vent
cool down to 100° C. at 10,000 p.s.i.—26 minutes The molded specimens thus obtained were smooth and unwarped. They had an average weight of 3.2 g. and a volume fraction 45.8% of the steel fiber. Specimen size was 4" x ⅜" x 0.030". Flexural tests were made on the Instron tester using a span of 1", a crosshead speed of 0.1"/minute and a chart speed of 10"/minute. There was thus obtained a flexural strength value of 93,800 p.s.i. and a flexural modulus of 10,130,000 p.s.i.

Example 2

The stainless steel fiber roving described in Example 1 was chopped into ⅛" lengths and 3.5 g. of the chopped fiber was added to an intimate, powdered mixture of 2.5 g. of 94:6 weight ratio acrylic acid/2-ethylhexyl acrylate copolymer and 1.33 g. of zinc oxide. After mixing well, 1.5 g. charges of the mix were molded into pellets, using the following molding cycle:

to 200° C. and 10,000 p.s.i.—10 min., then vent
to 250° C. and 10,000 u.s.i.—10 min., then vent
at 250° C. and 10,000 p.s.i.—15 min., then vent
at 250° C. and 10,000 p.s.i.—15 min., then vent
to 300° C. and 10,000 p.s.i.—10 min., then vent
at 300° C. and 10,000 p.s.i.—10 min., then vent
at 300° C. and 10,000 p.s.i.—5 min., then vent
cool to 100° at 10,000 p.s.i.—25 minutes There were thus obtained pellets having a diameter of ⅜" and a length of ½", containing a 20% volume fraction of the stainless steel fiber, and having a very smooth, glassy surface. When evaluated on the Instron tester, a flexural strength of 36,600 p.s.i. and a flexural modulus of 5,100,000 p.s.i. were determined. Testing of compression strength, also conducted on the Instron tester, gave a value of 60,900 p.s.i. Coefficient of thermal expansion tests were made in the thermal distortion apparatus described by L. E. Nielsen in Transactions of the Society of Rheology, 9, 243 (1965); and the linear coefficient of thermal expansion was determined from the total change in length of the test specimens within the range 30° C. to 150° C., as the temperature of the test chamber increased at a rate of 2° per minute. There was thus determined a coefficient of thermal expansion of $1.89 \times 10^{-5}$ per ° C.

The invention thus provides very heat-resistant, extremely tough, shaped composite structures which, depending upon the configuration of the mold, are useful in numerous industrial and space applications wherein high-strength, thermally stable components are required; e.g., rocket nozzles, diffusers, missle re-entry skin panels, rocket combustion insulators, and high temperature insulators of all kind.

It is to be understood that changes and variation may be made without departing from the spirit and scope of the invention as defined in the appended claims.

What we claim is:

1. A shaped composite structure comprising steel fiber as reinforcing filler in a matrix comprising the zinc salt of an acrylic acid copolymer, said structure having been prepared by compression molding, at a temperature of about 175° C. to 400° C. and a pressure of from about 5,000 to 50,000 p.s.i., a finely comminuted mixture of zinc oxide and said copolymer in contact with the fiber, the quantity of oxide in the mixture being approximately that which is stoichiometrically required for reaction of two carboxy groups of the copolymer with one molar equivalent of the oxide.

2. The structure defined in claim 1, further limited in that said fiber is stainless steel.

3. The structure defined in claim 1, further limited in that said fiber consists of discontinuous lengths of stainless steel filament.

4. The structure defined in claim 1, further limited in that the length of the fiber is positioned along one dimension of the composite structure and that the fiber is of stainless steel.

5. The structure defined in claim 1, further limited in that the polymer is a copolymer of acrylic acid and a vinyl monomer copolymerizable therewith, the ratio of said acrylic acid to said vinyl monomer being such that said copolymer consists at least 50 mole percent of acrylic acid units.

6. The structure defined in claim 1, further limited in that the polymer is a copolymer of acrylic acid and an alkyl acrylate having 1 to 12 carbon atoms in the alkyl radical and consisting at least 50 mole percent of acrylic acid units.

7. The structure defined in claim 1, further limited in that the fiber is stainless steel and that the polymer is a copolymer of acrylic acid and 2-ethylhexyl acrylate and consists at least 50 mole percent of acrylic acid units.

References Cited

UNITED STATES PATENTS

| | | | |
|---|---|---|---|
| 3,231,341 | 1/1966 | Sump et al. | 29—180 |
| 3,322,734 | 5/1967 | Rees | 260—79.3 |

OTHER REFERENCES

Fitzgerald et al., Viscoelastic Properties of the Salts of Some Polymeric Acids, in Royal Society of London, Ser. A, vol. 282, Oct. 20, 1964, pp. 137–146.

Delmonte, Metal-Filled Plastics, Reinhold Pub. Co., New York, 1961, pp. 107, 108, 122 and 123.

MORRIS LIEBMAN, Primary Examiner

J. H. DERRINGTON, Assistant Examiner

U.S. Cl. X.R.

161—170